US010997942B2

(12) United States Patent
Kim

(10) Patent No.: US 10,997,942 B2
(45) Date of Patent: May 4, 2021

(54) DISPLAY APPARATUS AND CONTROL METHOD OF THE SAME

(71) Applicant: SAMSUNG ELECTRONICS CO., LTD., Suwon-si (KR)

(72) Inventor: Tae-woo Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 14/275,976

(22) Filed: May 13, 2014

(65) Prior Publication Data

US 2014/0340284 A1 Nov. 20, 2014

(30) Foreign Application Priority Data

May 15, 2013 (KR) .................. 10-2013-0054953

(51) Int. Cl.
G09G 5/00 (2006.01)
G06F 3/14 (2006.01)

(52) U.S. Cl.
CPC ............. G09G 5/006 (2013.01); G06F 3/14 (2013.01); G06F 3/1454 (2013.01); G09G 2320/08 (2013.01); G09G 2370/04 (2013.01); G09G 2370/16 (2013.01); G09G 2370/20 (2013.01)

(58) Field of Classification Search
CPC .. H04N 5/44; G09G 2370/20; G09G 2370/22; G09G 5/00; G09G 5/006; G09G 2370/04; G09G 2370/16; G06F 3/14; G06F 3/1454
See application file for complete search history.

(56) References Cited

U.S. PATENT DOCUMENTS 8,037,218 B2 * 10/2011 Fujii .................. G06F 13/4282
710/38
9,841,935 B2 * 12/2017 Chang .................... G06F 3/122
2004/0140971 A1 7/2004 Yamazaki et al.
2008/0074560 A1 3/2008 Ichieda
(Continued)

FOREIGN PATENT DOCUMENTS

JP 2008-77380 A 4/2008
JP 2010-8937 A 1/2010
JP 2010008937 A * 1/2010 ............ G09G 5/006
JP 2010-177736 A 8/2010
(Continued)

OTHER PUBLICATIONS

Communication, Issued by the European Patent Office, dated Sep. 29, 2014, In counterpart European application No. 14168343.3.
(Continued)

Primary Examiner — Joe H Cheng
(74) Attorney, Agent, or Firm — Sughrue Mion, PLLC

(57) ABSTRACT

The control method of a display apparatus which is capable of receiving a source image played by a source device through a wireless communication unit and of displaying the received source image, the control method including: monitoring whether a wireless connection request signal transmitted by the source device is received; setting up a connection to the source device in accordance with the received wireless connection request signal; automatically converting an image input source into the wireless communication unit to display the source image played by the source device; and receiving and displaying the source image played by the source device.

22 Claims, 3 Drawing Sheets

(56) References Cited

U.S. PATENT DOCUMENTS

| | | | |
|---|---|---|---|
| 2009/0051765 A1* | 2/2009 | Moberly | G06F 19/3418 348/77 |
| 2009/0122201 A1* | 5/2009 | Freundlich et al. | 348/725 |
| 2009/0225091 A1 | 9/2009 | Noh et al. | |
| 2010/0188585 A1 | 7/2010 | Ichieda | |
| 2011/0090405 A1* | 4/2011 | Hiroki | G03B 21/14 348/705 |
| 2011/0296067 A1* | 12/2011 | Weidenkeller | G06F 13/385 710/110 |
| 2012/0302170 A1* | 11/2012 | Frazier | H04W 84/20 455/41.3 |
| 2013/0027289 A1* | 1/2013 | Choi | G06F 3/14 345/156 |
| 2013/0065686 A1* | 3/2013 | LeMay | G07F 17/3255 463/37 |
| 2013/0083243 A1 | 4/2013 | Freund et al. | |
| 2013/0282914 A1 | 10/2013 | Jeong et al. | |
| 2013/0322416 A1* | 12/2013 | Son | 370/338 |
| 2014/0006483 A1* | 1/2014 | Garmark | H04L 67/42 709/203 |
| 2014/0059169 A1* | 2/2014 | Ko | G06F 3/04845 709/217 |
| 2014/0090003 A1* | 3/2014 | Eguchi | H04L 65/4076 725/116 |

FOREIGN PATENT DOCUMENTS

| | | | |
|---|---|---|---|
| KR | 10-2007-0076759 A | | 7/2007 |
| KR | 10-2009-0094997 A | | 9/2009 |
| KR | 10-2011-0073239 A | | 6/2011 |
| KR | 10-2012-0008114 A | | 1/2012 |
| KR | 10-2012-0053767 A | | 5/2012 |
| KR | 10-2012-0073150 A | | 7/2012 |
| KR | 20130088712 A | * | 8/2013 |

OTHER PUBLICATIONS

Communication dated Jun. 6, 2018 by the European Patent Office in counterpart European Patent Application No. 14168343.3.

Office Action dated Jul. 8, 2019 by the Korean Intellectual Property Office in counterpart Korean Patent Application No. 10-2013-0054953.

Communication dated Jan. 27, 2020, issued by the Korean Intellectual Property Office in counterpart Korean Application No. 10-2013-0054953.

Communication dated Apr. 17, 2020, issued by the Korean Intellectual Property Office in counterpart Korean Application No. 10-2020-0042024.

Communication dated Mar. 3, 2021 by the European Patent Office in corresponding European Application No. 14 168 343.3.

* cited by examiner

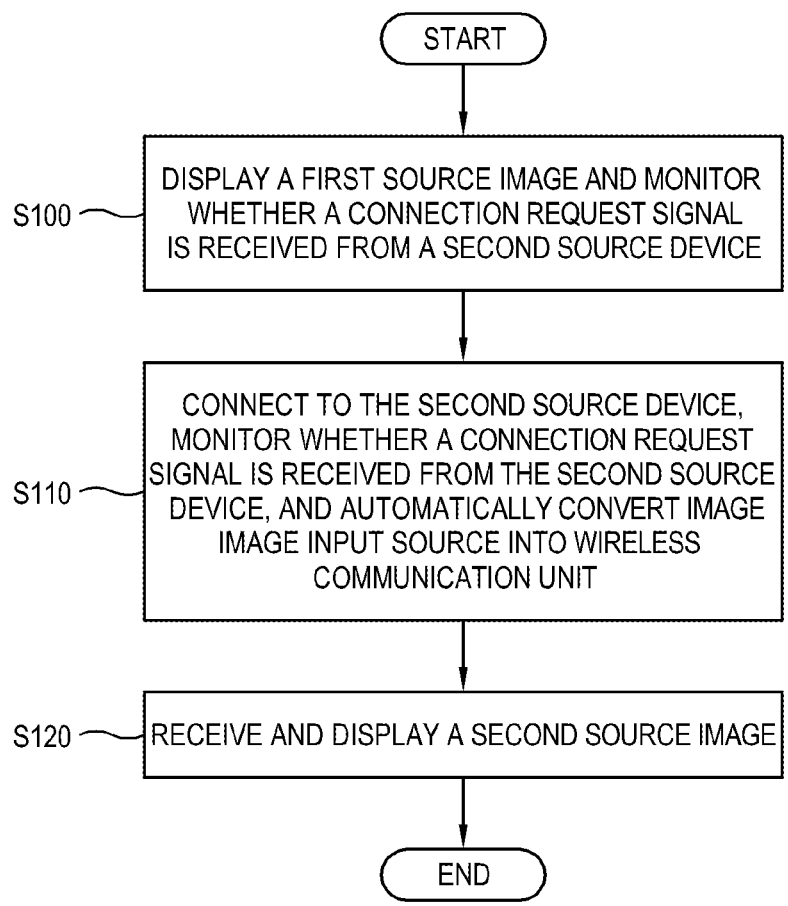

DISPLAY APPARATUS AND CONTROL METHOD OF THE SAME

CROSS-REFERENCE TO RELATED APPLICATION

This application claims priority from Korean Patent Application No. 10-2013-0054953, filed on May 15, 2013 in the Korean Intellectual Property Office, the disclosure of which is incorporated herein by reference in its entirety.

BACKGROUND

Field

Apparatuses and methods consistent with exemplary embodiments relate to a display apparatus and a control method of the same, and more particularly, to a display apparatus and a control method of the same which wirelessly receives and displays a source image played by a source device.

Description of the Related Art

With the development of wireless communication technology, images which are displayed on a display unit of a personal computer (PC), a smart phone and other image source devices may be wirelessly transmitted to and displayed by a display apparatus in real-time.

To share video contents, both a source device and a display apparatus recognize and are connected to each other, and the display apparatus receives video contents from the source device, and displays the received video contents.

Prior to such connection, the source device and the display apparatus should enter a discovery mode to discover each other. In the conventional art, a user should execute a particular application for the source device and the display apparatus, or input a particular key to generate a trigger to enter the discovery mode. That is, the user should input an instruction for the source device and the display apparatus to enter the discovery mode for interconnection.

If the source device and the display apparatus are interconnected for wireless display after discovering each other and/or service, the source device transmits a source image to the display apparatus, and the display apparatus renders the received source image and displays the rendered source image on a display unit.

To process the received source image and display the processed source image on the display unit, an input source of the display apparatus should be converted into an input source for wireless display.

For example, if a current input source of the display apparatus is a TV broadcasting channel, the display apparatus may not process the source image which is received from the source device and may not display the received source image on the display unit even if the display apparatus receives the source image from the source device. Accordingly, a user should convert the input source into an input source for wireless display to process and display the received source image.

In another conventional art, if a user executes a particular application such as activation of a wireless display mode through an input part of a display apparatus, the display apparatus simultaneously discovers the source device to be connected thereto and converts the input source into an input source for wireless display.

However, in the conventional art, to connect the source device and the display apparatus for wireless display of the source image, a user should input an instruction to connect the two devices through an input part of the source device, or input an instruction to connect the two devices and/or input an instruction to convert the input source into an input source for wireless display through an input part of the display apparatus.

SUMMARY

Exemplary embodiments may address at least the above problems and/or disadvantages and other disadvantages not described above.

The exemplary embodiments provide a display apparatus and a control method of the same which solves inconvenience of a user inputting an instruction to both a source device and a display apparatus to wirelessly connect the devices and convert an input source of the display apparatus to receive a source image from the source device and display the received source image by the display apparatus, and upon inputting an instruction by a user through an input part of the source device, an automatic connection operation and an automatic converting of the input source in response to the instruction are performed.

According to an aspect of an exemplary embodiment, there is provided a control method of a display apparatus which is capable of receiving a source image played by a source device through a wireless communication unit and of displaying the source image, the control method including: monitoring whether a wireless connection request signal transmitted by the source device is received; setting up a connection to the source device in accordance with the received wireless connection request signal; converting an image input source into the wireless communication unit to display the source image played by the source device; and receiving and displaying the source image played by the source device.

The image input source of the display apparatus may be automatically converted into the wireless communication unit in accordance with the received wireless connection request.

The setting up the connection to the source device may include automatically connecting to the source device without a user's input.

The source device and the display apparatus may communicate with each other through a Wi-Fi Peer-to-Peer (P2P).

The monitoring may include regularly entering a discovery mode by the wireless communication unit.

The wireless communication unit enters the discovery mode until the wireless connection request signal is received The received wireless connection request signal may include information of an automatic conversion of the image input source.

The information may be included in a service discovery request frame generated by a user's input.

The information may be included in a service discovery request frame which is generated by using a vender expansion field of an initial request frame of a generic advertising service (GAS) of 802.11u.

The received wireless connection request signal may include a service discovery request frame to discover a display apparatus supporting a function of wirelessly receiving a source image from the source device and displaying the received source image.

According to an aspect of another exemplary embodiment, there is provided a display apparatus which is capable of wirelessly receiving and displaying a source image played by a source device, the display apparatus including: a communication unit to wirelessly communicate with the source device; a display unit to display a source image received from the source device; and a controller to monitor whether a wireless connection request signal transmitted by the source device is received through the communication unit, set up a connection to the source device in accordance with the received wireless connection request signal, convert an image input source into the communication unit to display a source image played by the source device, and control the communication unit to receive the source image played by the source device and the display unit to display the received source image thereon.

The controller may automatically convert the image input source into the communication unit in accordance with the received wireless connection request signal.

The controller may set up the automatic connection to the source device without a user's input in accordance with the received wireless connection request signal.

The communication unit may communicate with the source device through a Wi-Fi P2P.

The controller may control the communication unit to regularly enter a discovery mode.

The wireless communication unit enters the discovery mode until the wireless connection request signal is received.

The controller may determine information of the automatic conversion of the image input device which is included in the received wireless connection request signal.

The information may be included in a service discovery request frame generated by a user's input.

The information may be included in a service discovery request frame which is generated by using a vender expansion field of an initial request frame of a generic advertising service (GAS) of 802.11u.

The received wireless connection request signal may include a service discovery request frame to discover a display apparatus supporting a function of wirelessly receiving a source image from the source device and displaying the received source image.

According to an aspect of another exemplary embodiment, there is provided a display system, the display system including: a source device which includes a user input unit, a communication unit configured to wirelessly communicate with a display apparatus, a display unit configured to display a source image thereon, and a controller configured to transmit a wireless connection request signal in accordance with a user's input through the user input unit, set up a connection to the display apparatus which has received the wireless connection request signal, and control the communication unit to transmit the source image to the display apparatus; and a display apparatus which includes a communication unit configured to wirelessly communicate with the source device, a display unit configured to display a source image received from the source device, and a controller configured to monitor whether a wireless connection request signal transmitted by the source image is received through the communication unit, set up a connection to the source device in accordance with the received wireless connection request signal, automatically convert an image input source into the communication unit to display a source image played by the source device, and control the communication unit to receive the source image played by the source device and the display unit to display the received source image thereon.

BRIEF DESCRIPTION OF THE DRAWINGS

The above and/or other aspects will become apparent by describing certain exemplary embodiments, with reference to the accompanying drawings, in which:

FIG. 3 is a flowchart showing a control method of the display apparatus according to an exemplary embodiment.

DETAILED DESCRIPTION OF EXEMPLARY EMBODIMENTS

Figure 1:
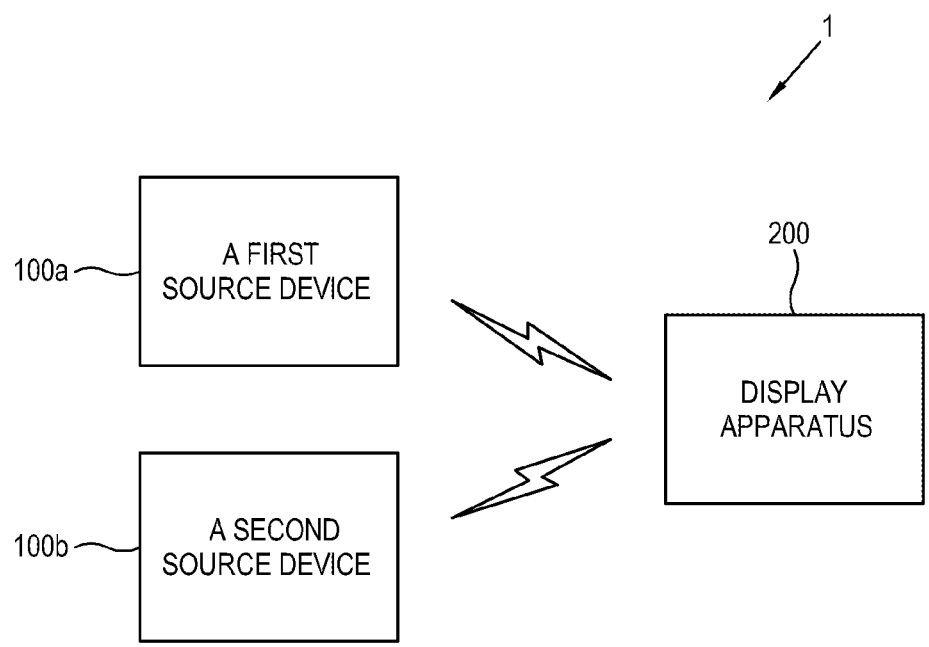
FIG. 1 is a block diagram of a wireless display system according to an exemplary embodiment.

Below, certain exemplary embodiments are described in greater detail with reference to accompanying drawings. The exemplary embodiments may be embodied in various forms without being limited to the exemplary embodiments set forth herein.

In the following description, like drawing reference numerals are used for the like elements, even in different drawings. The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the application with unnecessary detail.

FIG. 1 is a block diagram of a wireless display system 1 according to an exemplary embodiment.

As shown therein, the display system 1 according to an exemplary embodiment includes a source device 100 and a display apparatus 200 which communicate each other through a wireless network.

The source device 100 and the display apparatus 200 may perform peer-to-peer (P2P) connection to form a wireless network.

Alternatively, if the source device 100 and the display apparatus 200 are connected to same Wi-Fi network, they may form a link through Tunneled Direct Link Setup (TDLS).

For example, the source device 100 may be implemented as a PC, a laptop computer, a smart phone, a camera, a tablet PC, etc. which may generate and/or store video contents, and the display apparatus 200 may be implemented as a television (TV), a projector, a monitor, a mobile phone, etc. which may display an image and communicate with the source device.

The source device 100 includes a communication unit (not shown) which wirelessly communicates with the display apparatus 200, a display unit (not shown) which displays a source image thereon, a user input unit (not shown) which receives a user's instruction, and a controller (not shown) which controls overall operations of the source device 100.

The communication unit (not shown) may include a Wi-Fi module (not shown) as a wireless Internet module, and communicate with the display apparatus 200 through a Wi-Fi Direct (WFD), i.e., a Wi-Fi Peer-to-Peer (P2P).

The display unit (not shown) may display information and/or images processed by the source device 100, and include liquid crystal display (LCD), thin film transistor-liquid crystal display (TFT-LCD), light-emitting diode (LED), organic light-emitting diode (OLED), flexible display, and 3D display, but not limited thereto.

The user input unit (not shown) generates input data according to a user's input to control operations of the source device 100, and may include a key pad, dome switch, a (resistive/capacitive) touch pad, a jog wheel, a jog switch, etc.

The controller (not shown) controls the communication unit (not shown) to transmit a wireless connection request signal in accordance with a user's input through the user input unit (not shown). The user's input is an instruction to discover a display apparatus which supports a wireless display mode in which a source image transmitted by the source device 100 is received and displayed by the display apparatus 200 in real-time.

The controller (not shown) performs an active discovery by using a probe request frame in accordance with the user's input, and social channels having channel no. 1, 6 and 11 may be used to perform a quick discovery within the limited scope of discovery.

In the course of the aforementioned discovery, a service discovery request frame as a probe request frame may be transmitted to the display apparatus 200 to discover a service. The service discovery includes a service discovery regarding support/non-support of a function of wirelessly receiving a source image from the source device 100 and displaying the received source image in real-time.

Upon receiving a response frame for service discovery as a probe response frame from the display apparatus 200 through the communication unit (not shown), the controller (not shown) sets up connection to the display apparatus 200.

Otherwise, if there are a plurality of display apparatuses which have responded to the request, the controller (not shown) may generate a user interface (UI) and display the UI with a list of the plurality of display apparatuses on the display unit (not shown), and set up the connection to the display apparatus 200 which has been selected by a user through the UI.

If the source device 100 is connected to the display apparatus 200 the controller (not shown) transmits a source image played on the display unit (not shown) of the source device 100 to the display apparatus 200 through a Real-Time Streaming Protocol (RTSP).

Figure 2:
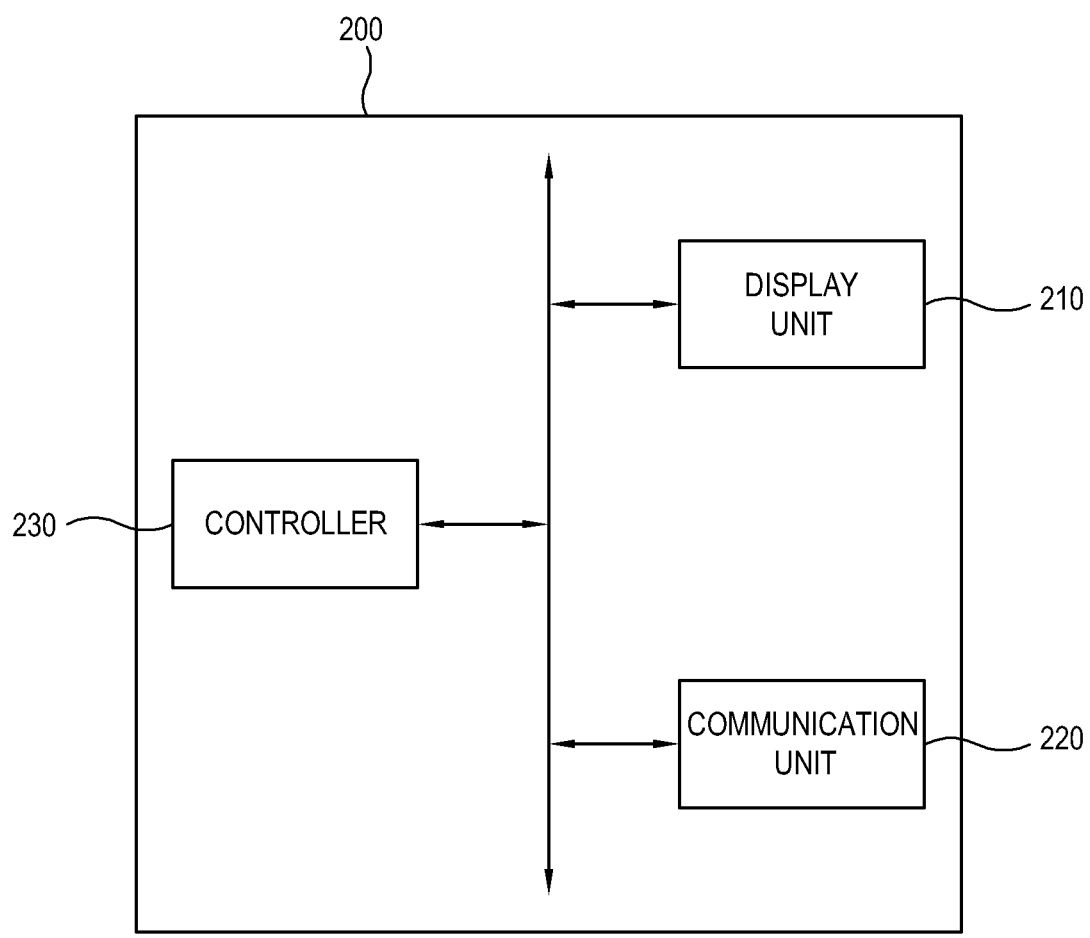
FIG. 2 is a block diagram of a display apparatus according to an exemplary embodiment.

FIG. 2 is a block diagram of the display apparatus 200 according to an exemplary embodiment.

Referring to FIG. 2, the display apparatus 200 includes an external device interface (not shown), a storage part (not shown), an image processor (not shown), a user input interface (not shown), a display unit 210, a communication unit 220 and a controller 230.

The external device interface (not shown) may be used to connect an external device and the display apparatus 200, and may include an A/V input and/or output part (not shown) or a wireless communication unit (not shown).

The external device interface (not shown) may be connected in a wired and/or wireless manner to an external device such as a digital versatile disk (DVD), a blue-ray, a game console, a camera, a camcorder, a computer (laptop computer), etc.

The external device interface (not shown) may receive images, audio and/or data signals from the connected external device, and output the images, audio or data signals processed by the controller 230 to the connected external device.

The A/V input and/or output part (not shown) may include a universal serial bus (USB) terminal, a composite video banking sync (CVBS) terminal, a component terminal, an S-video terminal (analog), a digital visual interface (DVI) terminal, a high definition multimedia interface (HDMI) terminal, an RGB terminal, a D-sub terminal, etc.

The storage part (not shown) may store therein programs for processing and controlling respective signals in the controller 230, and store the processed images, audio and/or data signals.

The storage part (not shown) may temporarily store therein images, audio and/or data signals received from the external device interface (not shown) or the communication unit 220, and store information of a predetermined broadcasting channel through a channel memory function.

The storage part (not shown) may further store therein an application or a list of applications received from the external device interface (not shown) or the communication unit 220.

For example, the storage part (not shown) may include a storage medium including at least one of a flash memory type, a hard disk type, a multimedia card micro type, a card type memory (e.g. SD or XD memory), a RAM, and a ROM (EEPROM).

The display apparatus 200 may play content files (e.g., video files, image files, music files, document files, application files, etc.) stored in the storage part (not shown).

The image processor (not shown) processes image signal which are received through the communication unit or content files stored in the display apparatus 200 according to various preset image processing operations. The image processor (not shown) may output the processed image signal to the display unit 210, on which an image may be displayed based on the image signal and/or content files output by the image processor.

The image processor (not shown) may perform image processing operations including a de-multiplexing operation for dividing a predetermined signal into signals by nature, a decoding operation corresponding to an image format of an image signal, a de-interlacing operation for converting an interlace image signal into a progressive image signal, a scaling operation for scaling an image signal into a preset resolution, a noise reduction operation for improving a quality of an image, a detail enhancement operation, and a frame refresh rate conversion, but not limited thereto.

The image processor (not shown) is implemented as an image processing board (not shown) which is formed by installing various chipsets (not shown), memories (not shown), electronic parts (not shown), wires (not shown) on a printed circuit board (PCB) (not shown), to perform the aforementioned processes.

The user input interface (not shown) may receive a signal input by a user and transmit the signal to the controller 230, or transmit a signal from the controller 230 to a remote controller (not shown). For example, the user input interface (not shown) may receive control signals regarding power on/off, selection of channel and setting of a screen from the remote controller (not shown) and process the control signals, or transmit control signals from the controller 230 to the remote controller (not shown), according to radio frequency (RF) or infrared (IR) communication type.

The user input interface may transmit a control signal input by a local key such as a power key, a channel key, a volume key, a setup key, etc. to the controller 230.

For example, the user input interface may transmit a control signal input by a sensing part (not shown) sensing a user's gesture to the controller 230, or transmit a signal from the controller 230 to the sensing part (not shown). The sensing part (not shown) may include a touch sensor, an audio sensor, a location sensor, a motion sensor, etc.

The display unit 210 displays an image thereon based on an image signal output by the image processor (not shown). The display unit 210 may be implemented as various display types including liquid crystal display (LCD), plasma, light-emitting diode (LED), organic light-emitting diode (OLED), surface-conduction electron-emitter, carbon nano-tube, nano-crystal, but not limited thereto.

The communication unit 220 may include a Wi-Fie module (not shown) as a wireless Internet module, and communicate with the source device 100 shown in FIG. 1 through Wi-Fi Direct (WFD), i.e., Wi-Fi Peer-to-Peer (P2P).

The communication unit 220 preferably supports Wi-Fi Certified n, Wi-Fi Direct (WFD), Wi-Fi Protected Access 2 (WPA2), Wi-Fi Multimedia (WMM) and Wi-Fi Protected Setup.

To form the Wi-Fi P2P connection with the source device 100 shown in FIG. 1, the controller 230 monitors whether a wireless connection request signal transmitted by the source device 100 is received through the communication unit 220.

The wireless connection request signal transmitted by the source device 100 may include a service discovery request frame for service discovery as a probe request frame for discovery of devices and/or services.

If the source device 100 performs an active discovery by using the probe request frame, the controller 230 controls the communication unit 220 to regularly enter a discovery mode for discovery of devices and/or services to be in a state for responding to the active discovery.

To be in such a state for responding to the active discovery of the source device 100, the controller 230 may control the communication unit 220 to be in a Listen state on a regular basis.

In the Listen state, the controller 230 monitors whether the wireless connection request signal such as a probe request frame from the source device 100 is received, and if the wireless connection request signal has not been received, controls the communication unit 220 to be in the Listen state on a regular basis until the wireless connection request signal is received. The controller 230 may monitor whether the wireless connection request signal from the source device 100 is received through the communication unit 220, and if the wireless connection request signal is received, may set up the connection to the source device 100 corresponding to the received wireless connection request signal.

Upon receiving the wireless connection request signal, the controller 230 may control the communication unit 200 to automatically set up the connection to the source device 100 without a user's input. The connection setup process includes an automatic authorization process performed to the source device 100 through a Wi-Fi Protected Setup (WPS) function.

The controller 230 may automatically convert the image input source into the communication unit 220 to display a source image played by the source device 100.

For example, if a current image input source of the display apparatus 200 is set as a DVD, a source image may not be displayed on the display unit 210 even if the source image from the source device 100 is received through the communication unit 220. In order to display the received source image, the controller 230 converts the image input source of the display apparatus 200 into the communication unit 220.

The controller 230 may automatically convert the image input source of the display apparatus 200 into the communication unit 220 according to the received wireless connection request signal.

The controller 230 may determine information of the automatic conversion of the image input source included in the received wireless connection request signal. For example, the information may be included in a service discovery request frame which has been generated by using WPS information element (IE).

The WPS IE may be used to make a packet of the service discovery request frame transmitted and received to discover a service of WFD device. The service discovery request frame is a probe request frame including WPS IE including a data field to request for service discovery.

If the service discovery request frame included in the received wireless connection request signal includes a field requesting for discovery of a wireless display function, i.e., a function of wirelessly receiving a source image played by a source device and displaying the source image, as a particular service, the controller 230 may determine that the wireless connection request signal include information of the automatic conversion of the image input source.

Alternatively, the information may be included in the service discovery request frame which has been generated by using a vender expansion field of an initial request frame of a generic advertising service (GAS) of 802.11u.

That is, if the vender expansion field includes a field requesting for discovery of the wireless display function as a particular service, the controller 230 may determine the vender expansion field as the information of the automatic conversion of the image input source.

After the source device 100 is connected to the display apparatus 200, the controller 230 processes the source image and displays the processed source image on the display unit 210 if the source image played by the source device 100 is received through the communication unit 220.

According to an exemplary embodiment, the controller 230 may be included in a control unit controlling overall elements of the display apparatus 200, or as a microcomputer controlling the communication unit 220.

Alternatively, a wireless reception connector (not shown) may include a communication unit (not shown), a connector (not shown) and a controller (not shown).

The communication unit (not shown) communicates with the source device 100 through Wi-Fi P2P. The connector (not shown) outputs the received source image transmitted by the source device 100 through the communication unit, to a display part (not shown). Upon receiving a wireless signal from the source device 100, the controller (not shown) controls the connector (not shown) to output a control command to convert an image input source of the display apparatus (not shown) into the connector (not shown) to thereby display the source image transmitted by the source device 100 on the display part of the display apparatus (not shown).

The connector (not shown) may include an HDMI, and the control command may be output to the display apparatus (not shown) through consumer electronics control (CEC) function.

In related art display apparatus which has no wireless display function, upon connecting a wireless reception connector (not shown), the wireless reception connector may perform a wireless communication with the source device 100, receive a source image, and output the source image to the related art display apparatus in which the input source has been converted.

Hereinafter, a control method of the display apparatus 200 which is capable of receiving a source image played by the source device 100, through a wireless communication unit, and displaying the received source image according to the exemplary embodiment will be described with reference to FIGS. 2 and 3. As an example, the wireless communication unit may be implemented by the communication unit 220 in FIG. 2.

As shown therein, the controller 230 monitors whether the wireless connection request signal transmitted by the source device 100 is received (operation S100). The wireless connection request signal transmitted by the source device 100 may include a service discovery request frame to discover a service, as a probe request frame for discovering devices and/or services.

The controller 230 monitors whether the wireless connection request signal such as the probe request frame from the source device 100 is received. If the wireless connection request signal has not been received, the controller 230 controls the wireless communication unit 220 to regularly enter the discovery mode until the wireless communication unit 220 receives the wireless connection request signal.

Upon receiving the wireless connection request signal, the controller 230 sets up the connection to the source device 100 in accordance with the received wireless connection request signal, and automatically converts the image input source of the display apparatus 200 into the wireless communication unit 220 to display the source image played by the source device 110 (operation S110).

The controller 230 controls the communication unit 220 to automatically set up the connection to the source device 100 without a user's input according to the received wireless connection request signal. The connection setup process includes an automatic authorization process performed to the source device 100 through the WPS function.

The controller 230 may automatically convert the image input source of the display apparatus 200 into the wireless communication unit 220 in accordance with the received wireless connection request signal.

The controller 230 may determine the information of the automatic conversion of the image input source included in the received wireless connection request signal.

For example, the information may be included in the service discovery request frame which has been generated by using WPS IE.

The WPS IE may be used to make a packet of the service discovery request frame transmitted and received to discover a service of WFD device. The service discovery request frame is a probe request frame including the WPS IE including a data field to request for service discovery.

If the service discovery request frame included in the received wireless connection request signal includes a field requesting for discovery of a wireless display function, i.e., a function of wirelessly receiving a source image played by a source device and displaying the source image, as a particular service, the controller 230 may determine that the wireless connection request signal includes information of the automatic conversion of the image input source.

Alternatively, the information may be included in the service discovery request frame which has been generated by using a vender expansion field of the GAS initial request frame of 802.11u.

That is, if the vender expansion field includes a field requesting for discovery of the wireless display function as a particular service, the controller 230 may determine that the vender expansion field includes the information of the automatic conversion of the image input source.

After being connected to the source device 100 through the connection setup process, the controller 230 receives and renders the source image played by the source device 100 and controls the display unit 210 to display the rendered sourced image thereon (operation S120).

While not restricted thereto, an exemplary embodiment can be written as computer programs and can be implemented in general-use digital computers that execute the programs using a non-transitory computer readable medium which stores a program including the step of monitoring whether a wireless connection request signal transmitted by the source device is received, the step of setting up a connection to the source device if the wireless connection request signal is received, the step of converting an image input source to the wireless communication unit to display the source image played by the source device, and the step of receiving and displaying the source image played by the source device.

Examples of the non-transitory computer readable recording medium include magnetic storage media (e.g., ROM, RAM, magnetic tape, floppy disks, hard disks, etc.) and optical recording media (e.g., CD-ROMs, or DVDs). Also, the exemplary embodiments may be written as computer programs transmitted over a computer-readable transmission medium, such as a carrier wave, and received and implemented in general-use digital computers that execute the programs. Moreover, while not required in all aspects, one or more units of the display apparatus illustrated in FIG. 2 can include a processor or microprocessor executing a computer program stored in a computer-readable medium.

As described above, a display apparatus and a control method of the same according to an exemplary embodiment solves inconvenience of a user inputting an instruction to both a source device and a display apparatus to wirelessly connect the devices and convert an input source of the display apparatus to receive a source image from the source device and display the source image by the display apparatus, and upon inputting an instruction by a user through an input part of the source device, an automatic connection operation and an automatic conversion of the input source are performed in accordance with the instruction.

Although a few exemplary embodiments have been shown and described, it will be appreciated by those skilled in the art that changes may be made in these exemplary embodiments without departing from the principles and spirit of the invention, the range of which is defined in the appended claims and their equivalents.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control method of a display apparatus including an external device interface configured to be connected through a wire to a first external device and a communication unit configured to wirelessly communicate with a second external device, the control method comprising:

setting a current image input source of the display apparatus to the external device interface;

displaying a first image received from the first external device through the external device interface;

in response to a connection request signal being received from the second external device through the communication unit, while the first image is displayed, identifying whether the connection request signal comprises predefined information for changing the current image input source of the display apparatus to the second external device;

in response to identifying that the connection request signal does not comprise the information, performing a connection with the second external device while displaying the first image received through the external device interface; and in response to identifying that the connection request signal comprises the information, performing a connection with second external device and changing the current image input source of the display apparatus from the external device interface to the communication unit based on the predefined information included in the connection request signal, so that the display apparatus displays a second image received from the second external device through the communication unit being set as the current image input source, wherein the external device interface is different from the communication unit.

2. The control method according to claim 1, wherein the changing the current image input source of the display apparatus comprises converting into the communication unit in accordance with the received connection request signal.

3. The control method according to claim 1, wherein the changing the current image input source of the display apparatus to the second external device is performed without a user's input.

4. The control method according to claim 1, wherein the second external device and the display apparatus communicate with each other through a Wi-Fi Peer-to-Peer (P2P).

5. The control method according to claim 1, wherein the identifying whether the connection request signal is received comprises regularly entering a discovery mode by the communication unit.

6. The control method according to claim 5, wherein the communication unit enters the discovery mode until the connection request signal is received.

7. The control method according to claim 1, wherein the received connection request signal comprises information of an automatic conversion of the current image input source.

8. The control method according to claim 7, wherein the information is included in a service discovery request frame generated by a user's input.

9. The control method according to claim 7, wherein the information is included in a service discovery request frame which is generated by using a vendor expansion field of an initial request frame of a generic advertising service (GAS) of 802.11u.

10. The control method according to claim 1, wherein the received connection request signal comprises a service discovery request frame to discover the display apparatus supporting a function of wirelessly receiving the second image from the second external device and displaying the second image.

11. A display apparatus comprising:
a display unit;
an external device interface configured to be connected to a first external device through a wire;
a communication unit configured to wirelessly communicate with a second external device, wherein the communication unit is different from the external device interface; and
a controller configured to:
set a current image input source of the display apparatus to the external device interface and control the display unit to display a first image received from the first external device through the external device interface,
in response to a connection request signal being received from the second external device through the communication unit, while the first image is displayed on the display unit, identify whether the connection request signal comprises predefined information for changing the current image input source of the display apparatus to the second external device, in response to identifying that the connection request signal does not comprise the information, performing a connection with the second external device while displaying the first image through the external device interface; and
in response to identifying that the connection request signal comprises the information, performing a connection with second external device and changing the current image input source of the display apparatus from the external device interface to the communication unit based on the predefined information included in the connection request signal, so that the display apparatus controls the display unit to display a second image received from the second external device through the communication unit being set as the current image input source.

12. The display apparatus according to claim 11, wherein the changing the current image input source of the display apparatus includes converting into the communication unit in accordance with the received connection request signal.

13. The display apparatus according to claim 11, wherein the changing the current image input source of the display apparatus to the second external device is performed without a user's input, in accordance with the received connection request signal.

14. The display apparatus according to claim 11, wherein the communication unit communicates with the second external device through a Wi-Fi P2P.

15. The display apparatus according to claim 11, wherein the controller controls the communication unit to regularly enter a discovery mode.

16. The display apparatus according to claim 15, wherein the communication unit enters the discovery mode until the connection request signal is received.

17. The display apparatus according to claim 11, wherein the controller determines information of an automatic conversion of the second external device which is included in the received connection request signal.

18. The display apparatus according to claim 17, wherein the information is included in a service discovery request frame generated by a user's input.

19. The display apparatus according to claim 17, wherein the information is included in a service discovery request frame which is generated by using a vendor expansion field of an initial request frame of a generic advertising service (GAS) of 802.11u.

20. The display apparatus according to claim 11, wherein the received connection request signal comprises a service discovery request frame to discover the display apparatus supporting a function of wirelessly receiving the second image from the second external device and displaying the second image.

21. A display system comprising:
a display apparatus;
a first external device; and
a second external device comprising:
a user input unit,
a first communication unit configured to wirelessly communicate with the display apparatus,
a first display unit configured to display a source image thereon, and
a first controller configured to:
transmit a connection request signal in accordance with a user's input through the user input unit,
set up a connection to the display apparatus which has received the connection request signal, and control the first communication unit of the second external device to transmit the source image to the display apparatus, wherein the display apparatus comprises:

an external device interface configured to be connected to the first external device through a wire, a second communication unit configured to wirelessly communicate with the second external device, wherein the second communication unit is different from the external device interface, a second display unit, and a second controller configured to:

set a current image input source of the display apparatus to the external device interface and control the second display unit to display a first image received from the first external device through the external device interface, in response to the connection request signal being received from the second external device through the second communication unit, while the first image is displayed on the second display unit, identify whether the connection request signal comprises predefined information for changing the current image input source of the display apparatus to the second external device, in response to identifying that the connection request signal does not comprise the information, performing a connection with the second external device while displaying the first image received through the external device interface, and in response to identifying that the connection request signal comprises the information, performing a connection with the second external device and change the current image input source from the external device interface to the second communication unit based on the predefined information included in the connection request signal, so that the display apparatus controls the second display unit of the display apparatus to display a second image received from the second external device through the second communication unit being set as the current image input source.

22. A non-transitory computer readable recording medium in which a program for executing the control method of claim 1 is recorded.

* * * * *